Nov. 6, 1956 F. L. MUNIZ 2,769,671
MECHANICAL BAGASSE LOOSENER AND PNEUMATIC PICKER
Filed Jan. 15, 1954 2 Sheets-Sheet 1

FIG. I

INVENTOR

Nov. 6, 1956 F. L. MUNIZ 2,769,671
MECHANICAL BAGASSE LOOSENER AND PNEUMATIC PICKER
Filed Jan. 15, 1954 2 Sheets-Sheet 2

INVENTOR

United States Patent Office 2,769,671
Patented Nov. 6, 1956

2,769,671

MECHANICAL BAGASSE LOOSENER AND PNEUMATIC PICKER

Francisco Lucas Muñiz, San Juan, Puerto Rico

Application January 15, 1954, Serial No. 404,288

2 Claims. (Cl. 302—38)

Brief summary of invention

The primary object of this machine, in a pneumatic conveying system, is to work loose, kick up and maintain bagasse or any hard packed material in a loose semi-flotation state, thus enabling the suction system to pick it up and carry it thru suction pipe or hose to the place where it is to be loaded, unloaded or fed to boiler furnace or any other apparatus.

Brief description of several views of attached drawings

Detailed description

Figure 1:
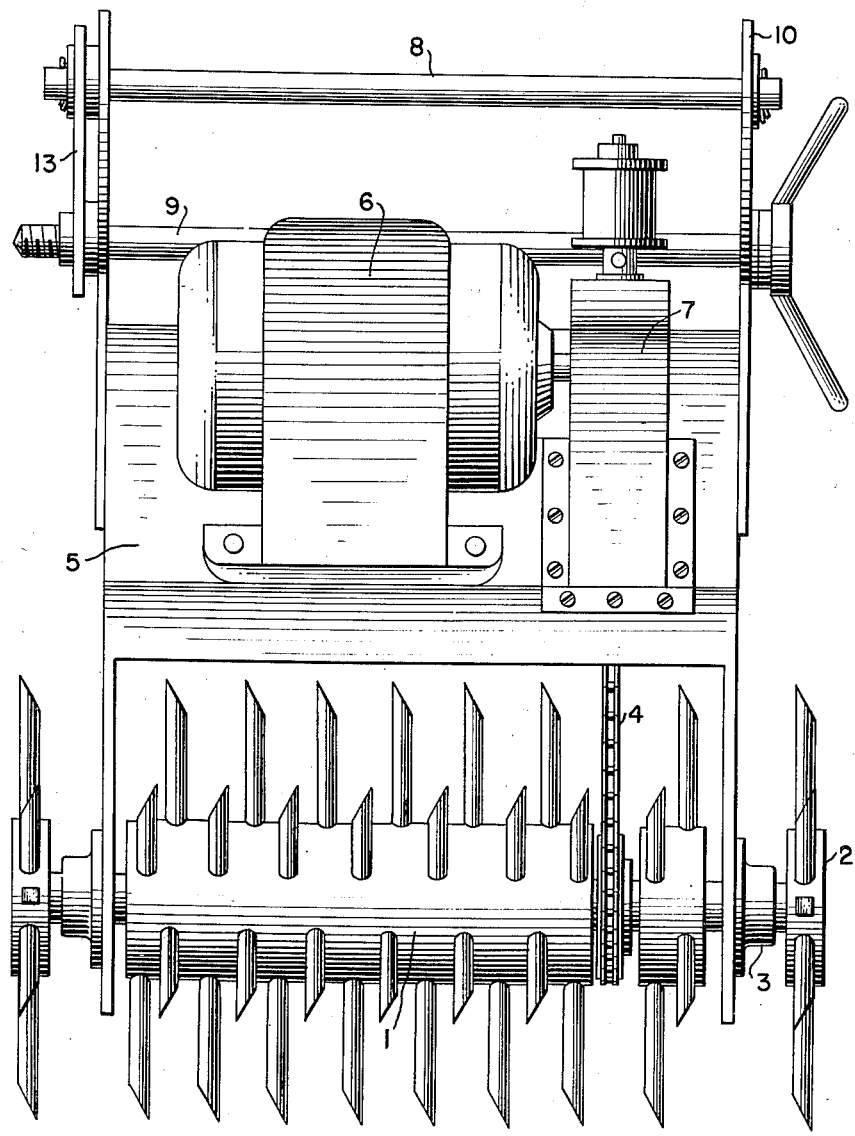
Figure 1 is a front elevational view of the mechanical bagasse loosener and pneumatic picker.
Figure 2:
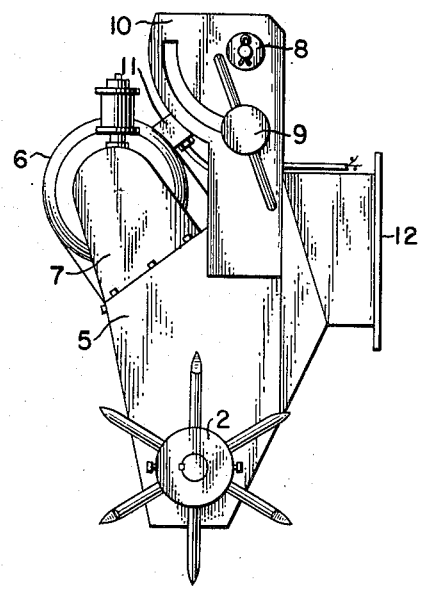
Figure 2 is a side elevational view of the machine looking toward the right hand side thereof as viewed from front to rear.
Figure 3:
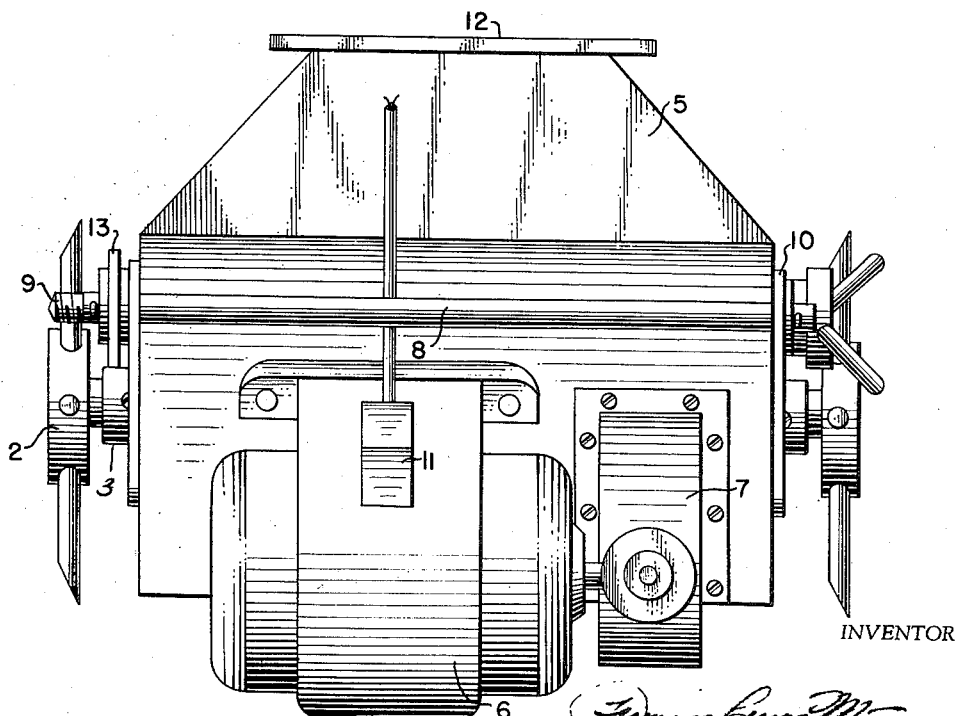
Figure 3 is a top plan view of the machine.

A revolving spiked tooth drum 1 mounted on a shaft and supported by means of roller bearings to the sides of a frame 5 revolves in either direction. The shaft extends outboard on both sides to take the side clearing spiked wheels 2 on each end. Forty-five steel spiked teeth are welded or otherwise fastened to the outer surface of the revolving drum 1. Similarly six teeth are fastened to each of the side clearing spiked wheels 2. Both, the revolving spiked tooth drum 1 and the side clearing spiked wheels 2, thru their common shaft, are driven by an electric motor 6 of the reversible type by means of a roller chain drive 4. Power for the motor comes thru wires connected at the connection box 11 attached to the motor. Protection and lubrication for the drive is provided by the chain drive cover and oiler 7.

The frame 5 constructed of welded steel plate carries the motor 6 bolted to the top cover. Two coupler side brackets 10 are welded to its sides. One fixed coupler shaft 8 and one adjustable coupler shaft 9 are secured to the upper part of the coupler side brackets 10. The threaded end of the adjustable coupler shaft 9 screws into the clamping nut holding plate 13. A suction flexible pipe flange 12 is welded to the upper rear of the frame 5.

Method of operation

This machine is to be used in combination with a pneumatic system and a crane or similar vehicle. It is coupled to the crane boom by means of the coupler shaft 8 and coupler adjustable shaft 9. One end of a rubber or flexible pipe of the pneumatic system is attached to the suction flexible pipe flange 12, the other end to the vacuum side of the pneumatic system. The electric wires run along the flexible pipe or along the crane's boom.

Movement of the machine, in a shaving like motion is accomplished by moving the crane to which the machine is attached. On either a forward or backward sweep of the machine over the bagasse or material pile the rotary motion of the spiked teeth in the revolving drum 1 will cut loose the material or bagasse, kicking it into the hollow portion of the frame box 5, where the suction created by the vacuum system will pick it up and convey it to the place where it is to be used, for example: to the furnaces of the boilers to be burnt as fuel, in the case of bagasse or to the truck for loading, etc.

I claim as my invention:

1. In a pneumatic conveying system, a machine for loosening and picking up hard packed bagasse or any other light material, comprising a revolving spiked tooth drum with outboard side clearing wheels, means for driving said spiked tooth drum and side wheels backward and forward, a frame to which said spiked tooth drum and wheels are journaled, said frame supporting a hollow portion having inlet means positioned to pick up material loosened by the said spiked tooth drum, said hollow portion serving as a pneumatic box, means to connect a flexible suction pipe to the hollow portion, and means for attaching the machine to a crane's boom.

2. A machine as in claim 1, said machine to be used in combination with a pneumatic handling system, the machine to be propelled by a crane, truck, tractor, lift truck or other vehicle, in operations involving feeding bagasse to boiler furnaces, feeding materials to an apparatus, or moving materials or bagasse to storage space or loading on trucks or other vehicles.

References Cited in the file of this patent

UNITED STATES PATENTS

| | | |
|---|---|---|
| 1,550,311 | Foster | Aug. 18, 1925 |
| 2,634,962 | Eglitis | Apr. 15, 1953 |